United States Patent [19]
Daykin et al.

[11] Patent Number: 4,487,341
[45] Date of Patent: Dec. 11, 1984

[54] DISPENSER FOR DISPENSING CREAMS AND ESPECIALLY SELF-FOAMING GELS

[75] Inventors: Kenneth Daykin, Stockport; Alan Straw, Macclesfield, both of England

[73] Assignee: Colgate-Palmolive Company, New York, N.Y.

[21] Appl. No.: 307,546

[22] Filed: Oct. 1, 1981

[51] Int. Cl.³ .............................................. G01F 11/00
[52] U.S. Cl. .................................................... 222/391
[58] Field of Search ............... 222/320, 321, 391, 319, 222/322, 251, 328, 409

[56] References Cited

U.S. PATENT DOCUMENTS

| | | | |
|---|---|---|---|
| 1,668,511 | 5/1928 | McLaughlin | 222/391 |
| 2,998,167 | 8/1961 | Boehm | 222/320 |
| 3,229,865 | 1/1966 | Heisler et al. | 222/392 |

Primary Examiner—Charles A. Marmor
Attorney, Agent, or Firm—Herbert S. Sylvester; Murray M. Grill; John A. Stemwedel

[57] ABSTRACT

A dispenser comprising a container having a neck provided with an outlet spout. A dip tube nozzle by use of a finger button is slidably mounted in the container and has a delivery opening alignable with the spout. Serrated teeth are formed on the container and dip tube and a piston is movably mounted on the dip tube for being depressed downwardly to force product up the dip tube. The piston is retained in the lowered position by the serrated teeth engaging a flexible disc while the dip tube is returned to a raised position by a suitable spring.

15 Claims, 5 Drawing Figures

FIG. 4
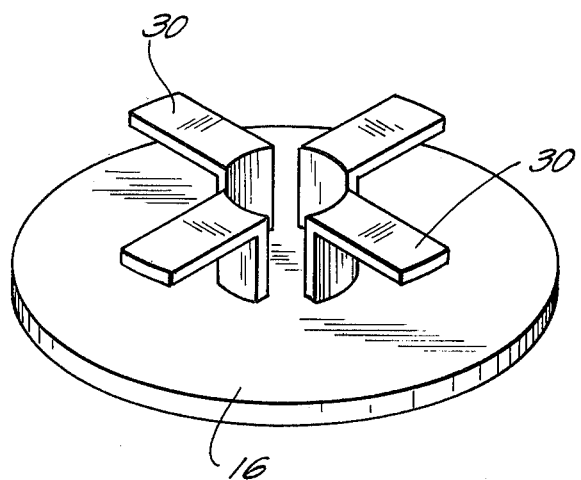
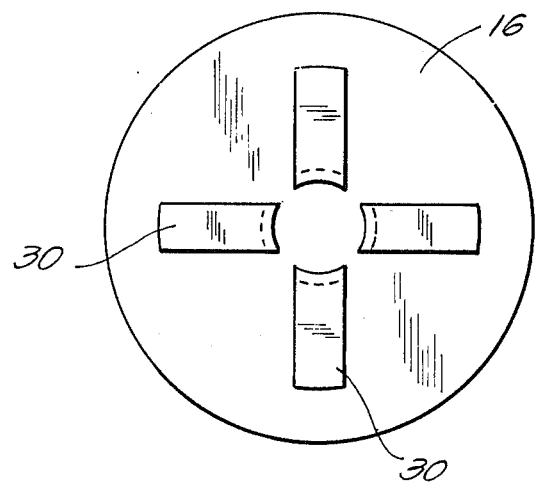
FIG. 5

DISPENSER FOR DISPENSING CREAMS AND ESPECIALLY SELF-FOAMING GELS

BACKGROUND OF THE INVENTION

1. Field of the Invention

This invention relates to a free standing dispenser for creams such as tooth paste or shaving cream which is especially adapted for use with self-foaming gels.

2. Description of Prior Art

Self standing dispensers for tooth paste and the like have been disclosed in German Patent publications Nos. 1,210,149 and 2,611,644.

In Nageotte, U.S. Pat. No. 2,356,874 there is disclosed a container provided with a ratchetting piston and having a slide valve nozzle. Spatz, U.S. Pat. No. 3,255,935, discloses an arrangement wherein fingers on a piston engage a vertical actuating rod as well as the inside wall of a container to permit one way action of the piston.

In Craven, U.S. Pat. No. 993,579, and Sohn, U.S. Pat. No. 2,732,101, a piston is used to force the contents through a central column.

SUMMARY OF THE INVENTION

It is the primary object of the present invention to provide a novel, free standing pump type dispenser to administer products packed under pressure and especially self-foaming gels.

The present invention achieves its object by way of a container having a spout for dispensing pressurized products through a dip tube having a piston movably mounted thereon. The container and the dip tube have serrated surfaces forming teeth engaged by a disc on the piston to permit only downward movement of the piston after initial depression of the dip tube. A spring is used to return the dip tube to its initial position and seats within guide means for centrally locating the dip tube. The dip tube is provided with a slot therein alignable with the spout.

BRIEF DESCRIPTION OF THE DRAWINGS

FIG. 4 is an enlarged perspective view of the base of the dispenser, and

FIG. 5 is a top plane view of the base of FIG. 4.

DETAILED DESCRIPTION OF THE INVENTION

Figure 1:
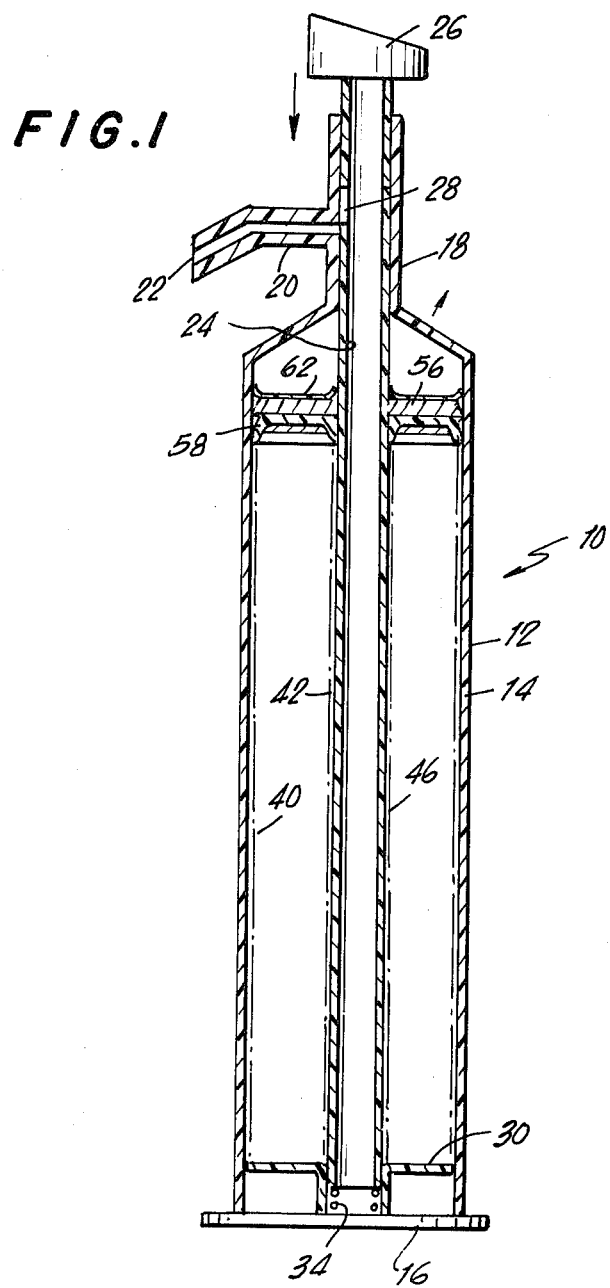
FIG. 1 is a vertical sectional view of the dispenser according to the present invention.

With continuing reference to the accompanying drawings wherein like reference numerals designate similar parts throughout the various views, reference numeral 10 generally designates a dispenser constructed in accordance with the present invention. The dispenser 10 includes a container 12 having cylindrical side walls 14 and a screw on or push on base 16.

Integral with the side walls 14 is a neck 18 having a spout 20 connected thereto. The spout has a product discharge opening 22.

A dip tube 24 is slidably mounted in the neck 18 and has a finger button 26 at the top thereof. A slot 28 which align with the opening 22 of spout 20 is provided in the dip tube and is in alignment when the dip tube is depressed.

The base 16 is provided with openwork guides 30 into which the open lower end of the dip tube 24 extends. A coil spring 34 urges the dip tube 24 to a raised position. The bottom of the dip tube may be swaged (not shown) to limit its uppermost position if desired.

The inner surface 40 of the cylindrical wall 14 is serrated to form teeth 42 which extend downwardly and inwardly forming shoulders 44. The outer surface 46 of the dip tube is correspondingly serrated to form downwardly and outwardly extending teeth 48 forming shoulders 50.

Figure 3:
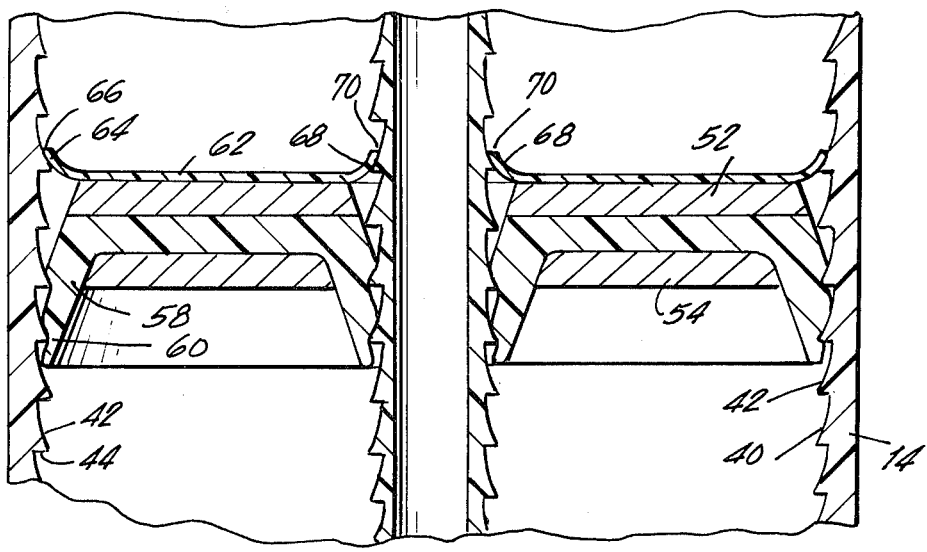
FIG. 3 is a view similar to FIG. 2, but after the dip tube has been initially depressed.
Figure 2:
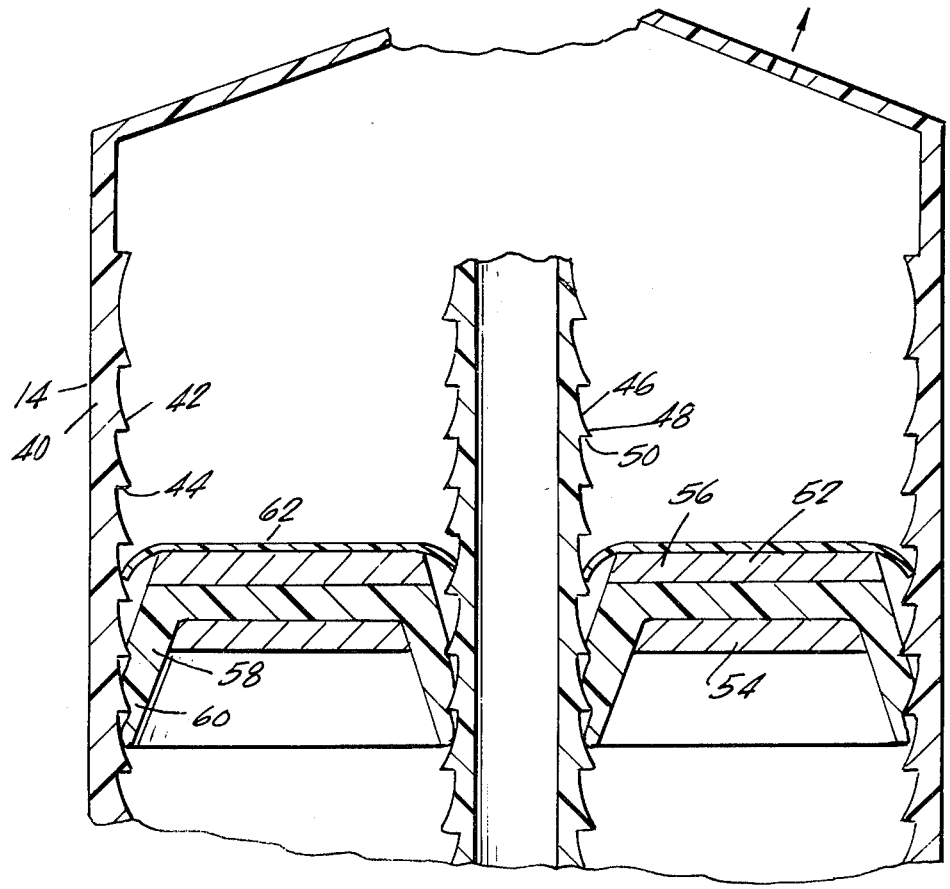
FIG. 2 is an enlarged detached sectional view showing the piston in an initial position.

Movably mounted on the dip tube 24 is a piston assembly 52 which includes a lower rigid disc 54 and an upper rigid disc 56 sandwiching a flexible washer therebetween which has a flexible lip 60 forming a product seal. The washer 58 is bonded to the lower disc 54 and upper disc 56. Also bonded to the rigid upper disc 56 is a less flexible but flexible disc 62 formed of plastic or metal which has an outer peripheral edge 64 forming initially a downwardly turned lip 66 (FIG. 2). An inner dip tube 24 is initially down turned forming peripheral lip 70. After initial depression (FIG. 3), the lips 66 and 70 are snapped to an upwardly turned position.

After the dip tube with the piston assembly 52 in a lowermost position has been inserted in the neck, the separate base 16 is then screwed or pushed on in place, bonded if desired. The product is then filled through the top of the dip tube 24; during this process the piston will be pushed up under pressure until the container is filled. During the filling process, upward movement of the piston is possible because of the downturned lips 66 and 70 sliding over the teeth 42 and 68. When the container is full with the piston 52 at the top, the finger button 26 is secured to the dip tube 24. It is noted that no product can exit from opening 22 due to the fact that the slot 28 is not in alignment therewith.

Initial depression of the tip tube 24 will snap the lips 64 and 70 to an upwardly extending position thereby preventing the rise of the piston when the dip tube rises because the lip 64 will engage the shoulder 44 upon upward movement of the dip tube. Depression of the dip tube will cause a shoulder 50 to engage the lip 70 carrying the piston assembly 52 downwardly thereby forcing product up under pressure through the open end of dip tube 24. Depression of the dip tube will align the slot 28 with opening 22 permitting product to be discharged until the finger button 26 is released closing the valve formed by slot 28.

Contemplated size of the container is 3.5 cm internal diameter with about 13 cm effective internal length giving rise to a capacity of approximately 125 ml. The maximum stroke is 0.5 cm extruding approximately 4.5 ml with a complete stroke. A partial stroke of course would give less. If a narrower container is used, the piston will have less cross-sectional area, and less finger pressure will be needed, but the capacity would be diminished, and conversely.

What is claimed is:

1. A dispenser comprising a container having a neck, a spout connected to said neck, a dip tube slidably mounted in said neck and including a slot movable into alignment with said spout when said dip tube is depressed, the outer surface of said dip tube and the inner surface of said container being serrated to form teeth, a piston slidably mounted on said dip tube, said piston including a flexible disc having initially downturned concentric peripheral edges permitting initial movement of said piston upwardly during a filling operation, the inner and outer peripheral edges of the flexible disk engage the serrated teeth on the dip tube and inner surface of the wall, respectively, said concentric peripheral edges being turned upwardly upon initial downward movement of said dip tube.

2. A dispenser comprising a container having an outlet, a dip tube in said container adapted to be aligned with said outlet, the outer surface of said dip tube and the inner surface of said container being serrated to form teeth, a piston slidably mounted on said dip tube, said piston including a flexible disc having an initially downturned concentric peripheral edges portion permitting initial movement of said piston upwardly during a filling operation, the inner and outer peripheral edges of the flexible disk engage the serrated teeth on the dip tube and inner surface of the wall, respectively, said concentric peripheral edges being turned upwardly upon initial downward movement of said dip tube.

3. A dispenser according to claim 1, including spring means for returning said dip tube to a raised initial position.

4. A dispenser according to claim 3, including guide means for the lower end of said dip tube.

5. A dispenser according to claim 1, wherein said container includes cylindrical member, and a base secured to said cylindrical member.

6. A dispenser according to claim 5, including guide means for the lower end of said dip tube on said base.

7. A dispenser according to claim 6, including spring means within said guide means and engageable with said tip tube to return said dip tube to an initial position.

8. A dispenser according to claim 1, wherein said piston includes a pair of rigid discs, a flexible washer between said discs, said flexible disc being secured to the uppermost of said rigid discs.

9. A dispenser according to claim 1, including a finger button at the top of said dip tube for depressing said dip tube.

10. A dispenser according to claim 7, wherein said guide means permits flow into the lower end of said dip tube and holds said dip tube centrally in said container.

11. A dispenser according to claim 1, including guide means for holding said dip tube centrally in said container.

12. A dispenser according to claim 11, including spring means for returning said dip tube to a raised position.

13. A dispenser according to claim 12, including finger button means for depressing said dip tube.

14. A dispenser according to claim 13, wherein said piston includes a pair or rigid discs, a flexible washer between said discs, said flexible disc being secured to the uppermost of said rigid discs.

15. A dispenser according to claim 7, wherein said piston includes a pair or rigid discs, a flexible washer between said discs, said flexible disc being secured to the uppermost of said rigid discs.

* * * * *